(12) United States Patent
Kidston et al.

(10) Patent No.: US 7,233,855 B1
(45) Date of Patent: Jun. 19, 2007

(54) APPARATUS AND METHOD FOR COMPARING THE FUEL CONSUMPTION OF AN ALTERNATIVE FUEL VEHICLE WITH THAT OF A TRADITIONALLY FUELED COMPARISON VEHICLE

(75) Inventors: Kevin S. Kidston, New Hudson, MI (US); Richard A. Marsh, Beverly Hills, MI (US); Paul E. Reinke, Rochester Hills, MI (US); Jonathan R. Schwarz, Oakland Township, MI (US); Carlene M. Sienkiewicz, Brighton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 14 days.

(21) Appl. No.: 11/297,299

(22) Filed: Dec. 8, 2005

(51) Int. Cl.
*F02D 43/04* (2006.01)
*G06F 19/00* (2006.01)
*G06G 7/70* (2006.01)

(52) U.S. Cl. .................. 701/102; 701/115; 701/22; 340/439

(58) Field of Classification Search ........... 701/102, 701/104, 105, 115, 22; 180/65.1–65.5; 123/41 E, 123/198 D, 1 A, 304; 340/439
See application file for complete search history.

(56) References Cited

U.S. PATENT DOCUMENTS

| | | | |
|---|---|---|---|
| 5,847,644 A * | 12/1998 | Weisman et al. | 340/439 |
| 6,236,908 B1 * | 5/2001 | Cheng et al. | 701/1 |
| 6,450,274 B1 * | 9/2002 | Konno et al. | 180/65.3 |
| 7,149,618 B2 * | 12/2006 | Heap et al. | 701/102 |

\* cited by examiner

*Primary Examiner*—Stephen K. Cronin
*Assistant Examiner*—Johnny H. Hoang
(74) *Attorney, Agent, or Firm*—Laura C. Hargitt (57) ABSTRACT

A fuel savings informational system is provided for implementation on an alternative fuel vehicle the operation of which may be characterized by a first plurality of fixed parameters and a second plurality of variable parameters. The system compares the fuel consumption of the alternative fuel vehicle to that of a virtual comparison vehicle characterized by a third plurality of fixed parameters, and comprises a plurality of sensors for monitoring the second plurality and a processor coupled thereto. The processor is configured to recall the first and third pluralities, capture data corresponding to the second plurality, and determine the fuel consumption of the alternative fuel vehicle from the second plurality. The processor is further configured to estimate the fuel consumption of the comparison vehicle from the first, second, and third pluralities, and compare the fuel consumption of the alternative fuel vehicle to the estimated fuel consumption of the comparison vehicle.

20 Claims, 5 Drawing Sheets

APPARATUS AND METHOD FOR COMPARING THE FUEL CONSUMPTION OF AN ALTERNATIVE FUEL VEHICLE WITH THAT OF A TRADITIONALLY FUELED COMPARISON VEHICLE

TECHNICAL FIELD

The present invention relates generally to a fuel savings display system for use in an alternative fuel vehicle (e.g., a hybrid vehicle) and, more particularly, to an apparatus and method for comparing the fuel consumption of an alternative fuel vehicle with that of a traditionally fueled comparison vehicle.

BACKGROUND OF THE INVENTION

Since the industrial revolution, society has been reliant on fossil fuels as its foremost energy source. It is common knowledge that fossil fuels are in limited supply and that the combustion of fossil fuels releases environmental pollutants (e.g., carbon monoxide). Petroleum, which currently supplies approximately 40% of the planet's energy, has overtaken coal as the most commonly consumed fossil fuel. One of petroleum's major uses is the production of gasoline, which drives the internal combustion engines of the more than 530 million gasoline-powered cars currently in use throughout the world. In contrast, a much smaller number of automobiles in existence today utilize alternative fuels.

Hybrid electric vehicles improve gas mileage by combining a battery-powered electric motor/generator with a highly efficient heat engine, typically an internal combustion engine. In some of these hybrid or mild-hybrid power train systems, an electric motor-generator system replaces the conventional starter motor and the alternator. When the hybrid vehicle is decelerating or is stopped, the fuel flow to the gasoline-powered engine is shut-off to improve fuel economy. The motor-generator system of the hybrid vehicle is implemented to enable this fuel shut-off feature with substantially no effect on drivability.

Owners of hybrid automobiles have expressed a desire that they be provided with data regarding short term and long term fuel savings. Considering this, it should be appreciated that it would be desirable to provide a fuel usage and savings informational system for use on an alternative fuel vehicle that determines the vehicle's fuel consumption and compares it to the quantity of fuel that would be consumed by an analogous, exclusively gasoline-powered vehicle under similar driving conditions. It should further be appreciated that it would be desirable for such a fuel informational system to provide accurate data regarding the vehicle's instantaneous fuel usage that a driver may utilize to learn how to operate the vehicle in a more fuel efficient manner. Furthermore, other desirable features and functions of the present invention will become apparent from the subsequent detailed description of the invention and the appended claims, taken in conjunction with the accompanying drawings and this background of the invention.

SUMMARY OF THE INVENTION

A fuel savings informational system is provided for use on an alternative fuel vehicle the operation of which may be characterized by a first plurality of fixed parameters and a second plurality of variable parameters. The informational system compares the fuel consumption of the alternative fuel vehicle to that of a virtual comparison vehicle characterized by a third plurality of fixed parameters, and comprises a plurality of sensors for monitoring the second plurality of variable parameters and a processor coupled to the plurality of sensors. The processor is configured to recall the first and third pluralities of fixed parameters, capture data corresponding to the second plurality of variable parameters, and determine the fuel consumption of the alternative fuel vehicle from the second plurality of variable parameters. The processor is further configured to estimate the fuel consumption of the comparison vehicle from the second plurality of variable parameters and from the first and third pluralities of fixed parameters, and compare the fuel consumption of the alternative fuel vehicle to the estimated fuel consumption of the comparison vehicle.

A method for informing a driver of a hybrid vehicle of the difference between the fuel consumption rate of a virtual comparison vehicle and the fuel consumption rate of a hybrid vehicle is also provided. The hybrid vehicle includes a display, a plurality of sensors for measuring a plurality of variable operational parameters relating to the driving conditions experienced by the hybrid vehicle, and a processor for recalling a plurality of fixed parameters describing physical aspects of the hybrid vehicle and the comparison vehicle. The method comprises recalling the plurality of fixed parameters, capturing data corresponding to the plurality of variable operational parameters, and determining hybrid vehicle fuel consumption rate from the plurality of variable operational parameters. The comparison vehicle fuel consumption rate is estimated from the plurality of variable operational parameters and the plurality of fixed parameters, the hybrid vehicle fuel consumption rate is compared to comparison vehicle fuel consumption rate. Lastly, the results of the comparison are displayed on the display.

DESCRIPTION OF THE DRAWINGS

The present invention will hereinafter be described in conjunction with the following figures, wherein like reference numerals denote like elements, and.

DESCRIPTION OF AN EXEMPLARY EMBODIMENT

The following detailed description of the invention is merely exemplary in nature and is not intended to limit the scope, applicability, or configuration of the invention in any way. Rather, the following description provides a convenient illustration for implementing exemplary embodiments of the invention. Various changes to the described embodiments may be made in the function and arrangement of the elements described herein without departing from the scope of the invention.

Figure 1:
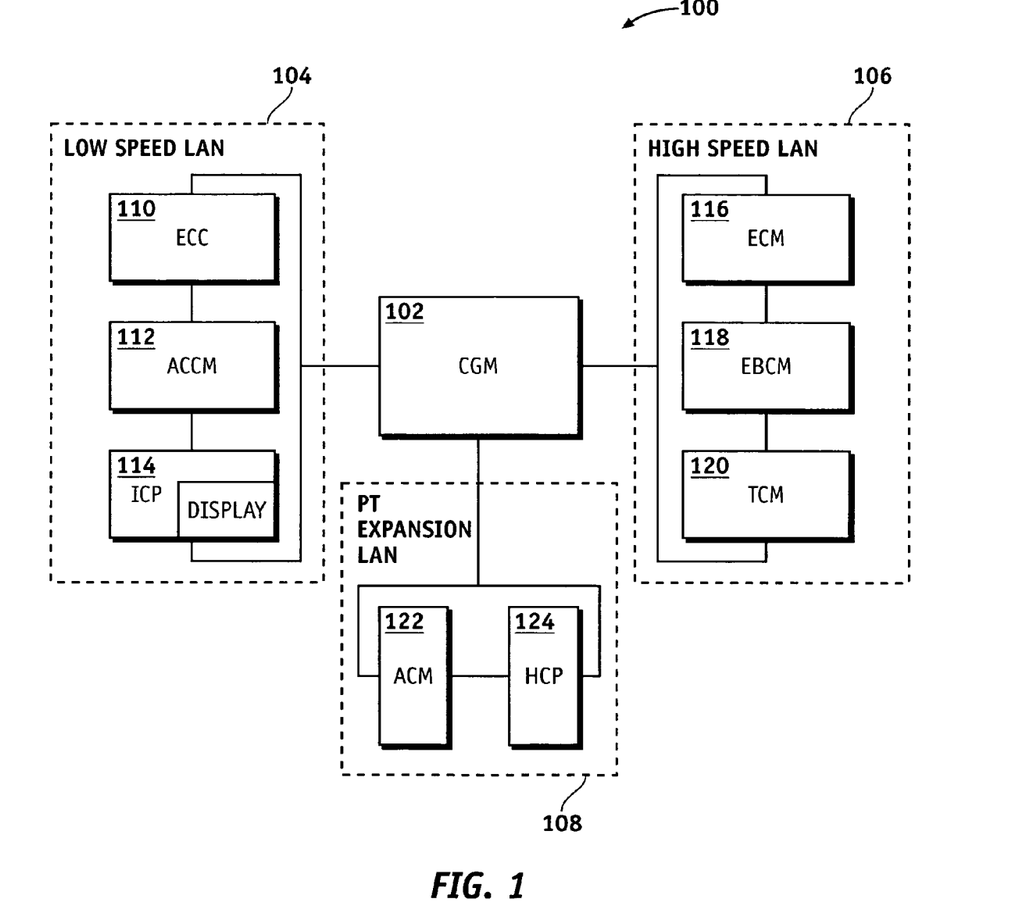
FIG. 1 is a functional block diagram of a vehicular system suitable for carrying out the inventive fuel usage comparison process.

FIG. 1 is a functional block diagram of a vehicular system 100 for comparing the fuel consumption of an alternative fuel vehicle with that of a traditionally fueled comparison vehicle. The system comprises a central Communications Gateway Module (CGM) 102 that is coupled to three Local Area Networks (LANs): Low Speed LAN 104, High Speed LAN 106, and Power-Train Expansion LAN 108. As is well known in the automotive industry, LANs 104, 106, and 108 may each comprise a plurality of components; however, only some of these components are shown and discussed below to ensure clarity. As can be seen in FIG. 1, Low Speed LAN 104 comprises an Electronic Climate Control (ECC) 110, an Air Conditioning Control Module (ACCM) 112, and an Instrument Control Panel (ICP) 114. High Speed LAN 106 comprises an Engine Control Module (ECM) 116, an Electronic Brake Control Module (EBCM) 118, and a Transmission Control Module (TCM) 120. Lastly, Power-Train Expansion LAN 108 comprises an Accessory Control Module (ACM) 122 and a Hybrid Control Processor (HCP) 124. As will be more fully described below, each of these components may communicate with CGM 102 on their respective LANs as the inventive fuel usage comparison process is performed.

System 100 may be deployed on an alternative fuel vehicle (referred to as the host vehicle below) and may determine and display fuel usage information regarding various aspects of the host vehicle's fuel usage. Some or all of these aspects may be compared to fuel usage information determined for a virtual model of a similar vehicle that is exclusively powered by gasoline (referred to as the comparison vehicle below). More specifically, a processor or processors associated with system 100 (e.g., employed in CGM 102) may determine fuel usage information (e.g., fuel consumption rate) for both the host vehicle and the comparison vehicle utilizing driving parameters experienced by the host vehicle and reported by various components on the Local Area Networks. After establishing the desired fuel usage statistics, a processor or module (e.g., CGM 102) may display the statistics on a suitable display in the manner described below.

Figure 2:
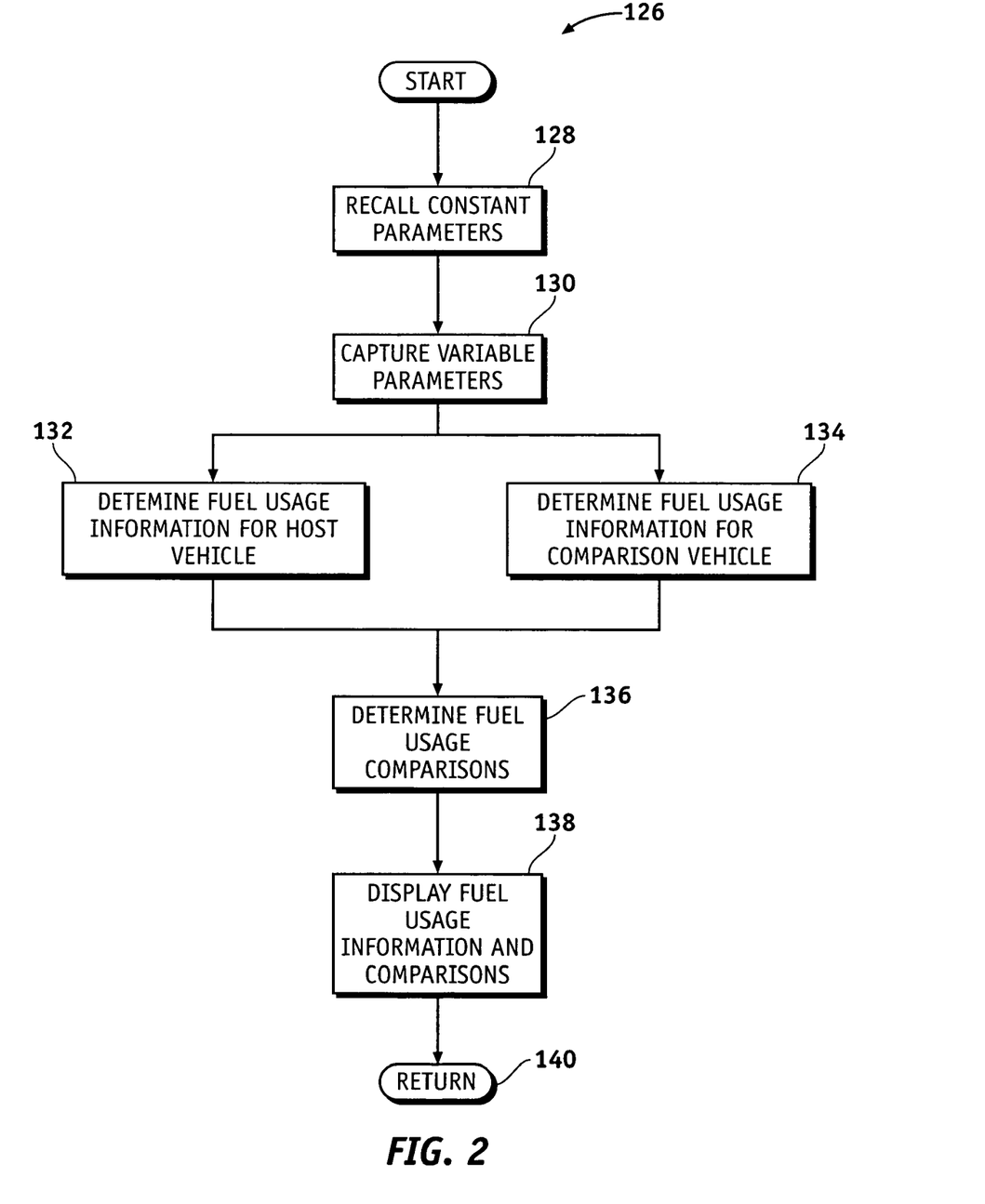
FIG. 2 is a flowchart illustrating a first, generalized embodiment of the inventive fuel usage comparison process.

FIG. 2 is a flowchart illustrating a first, generalized embodiment of a fuel usage comparison process 126 that may be carried out by system 100. The process begins by recalling constant or fixed parameters that describe physical aspects of the host vehicle and/or the comparison vehicle (e.g., the tire rolling radii of the host vehicle and the comparison vehicle, etc.) and capturing variable operational parameters experienced by the host vehicle during operation (e.g., vehicular speed, engine RPM, etc.) as illustrated in FIG. 2 at 128 and 130, respectively. From these parameters, fuel usage information for the host vehicle may be determined by the vehicle's processors in accordance with a know technique (132). As indicated in FIG. 2 at 134, fuel usage information for the comparison vehicle may be determined by execution of a comparison vehicle fuel usage process 150 discussed below in conjunction with FIGS. 4 and 5. Very generally, such a comparison vehicle fuel usage process may determine the fuel consumption rate of the comparison vehicle by establishing the current rotational speed and torque of the host vehicle's wheels and, subsequently, determining the torque and speed (in RPM) at which the engine of the comparison vehicle must operate to generate to produce the same rotational speed and torque at the comparison vehicle's wheels. After fuel usage information has been determined for the host vehicle and the comparison vehicle, fuel usage comparison data (e.g., the host vehicle's fuel savings relative to the comparison vehicle for a given period of time) may then be determined (136) and displayed (138) on a display associated with ICP 114, a navigational system, a driver control interface, or the like. Finally, as indicated in FIG. 2 at 140, process 126 may be repeated.

Figure 3:
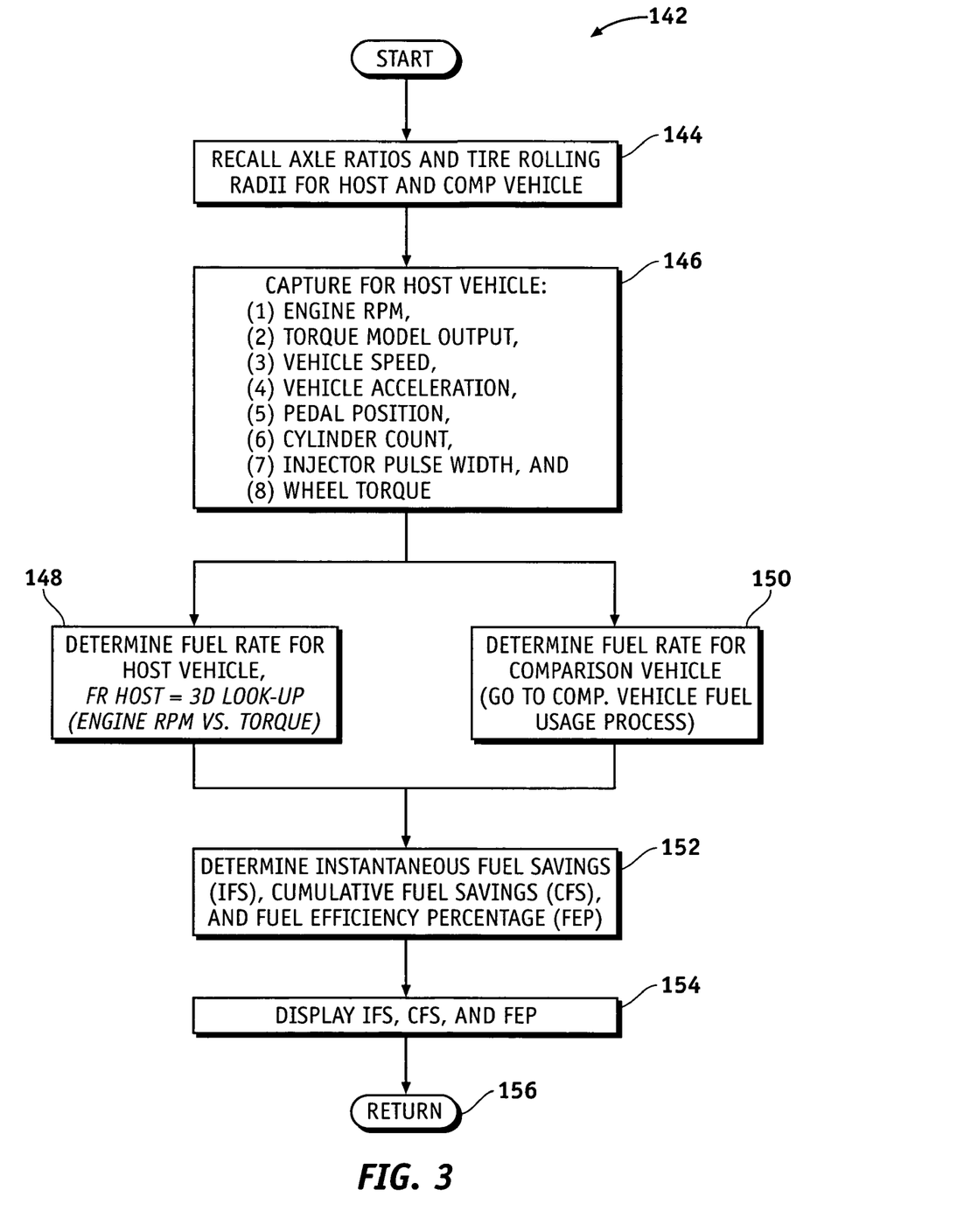
FIG. 3 is a flowchart illustrating a second, more detailed embodiment of the inventive fuel usage comparison process.

FIG. 3 is a flowchart illustrating a second, more detailed embodiment of a fuel usage comparison process 142 that may be carried out by system 100. As indicated at 144, process 142 may begin by recalling fixed vehicular parameters; i.e., the tire rolling radii and axle ratios for both the host vehicle and the comparison vehicle. Next, a group of variable parameters may be gathered indicative of the current driving conditions under which the host vehicle is operating (146). These parameters may include: (1) engine speed/RPM, (2) torque model output, (3) vehicular speed, (4) vehicular acceleration, (5) pedal position, (6) cylinder count, (7) injector pulse width, and (8) wheel torque. The current values of these parameters are reported over the Local Area Networks by the components discussed above in conjunction with FIG. 1. As an example, the following components may determine and report the following host vehicle parameters. ECM 116 may report: (a) engine speed, which may be determined by the rotational frequency of the host vehicle's crank shaft; (b) the torque model output, which may be determined from the axle torque reported to ECM 116 by HCP 124; (c) the speed of the host vehicle; (d) cylinder count; and (e) injector pulse width. EBCM 118 may report: (a) vehicle acceleration, which may be determined from the rotational frequency of the host vehicle's wheels, (b) accelerator pedal position, and (c) wheel torque.

After capturing the current status of each of the variable operational parameters, the process may determine the host vehicle's fuel consumption rate by reference to a known three dimensional look-up table that compares fuel rate to engine speed and torque, as indicated at 148 in FIG. 3. Alternatively, the host vehicle's fuel consumption rate be expressed as a function of cylinder count, pulse width, and engine speed. If desired, the host vehicle's fuel consumption rate may be adjusted by further considering other relevant factors (e.g., engine coolant temperature, transmission oil temperature, elapsed time since start, pedal position, etc.). Also, after the variable parameters have been captured, the fuel consumption rate for the comparison vehicle may determined by execution of a suitable comparison vehicle fuel usage process (150), such as the exemplary process describe in detail below in conjunction with FIGS. 4 and 5. When the host vehicle's fuel rate and the comparison vehicle's fuel rate have been determined, they may be compared in a number of ways. As suggested in FIG. 3 at 152, for example, the instantaneous fuel savings (IFS), the updated cumulative fuel savings (CFS), and the fuel efficiency percentage (FEP) may be determined via equations (1), (2), and (3) below:

$$IFS = \frac{FR_{comp.} - FR_{host}}{t} \qquad (1)$$

where FR is fuel rate and t is elapsed time, and $$CFS_{new} = IFS + CFS_{old} \qquad (2)$$

where $CFS_{new}$ is the updated cumulative fuel savings and $CFS_{old}$ is the prior cumulative fuel savings (i.e., the cumulative fuel savings that does not account for the fuel used by the host vehicle during the latest iteration of the fuel comparison process).

$$FEP = 100\left(\frac{FR_{comp.} - FR_{host}}{FR_{comp}}\right) \quad (3)$$

After establishing the desired fuel comparison metrics, the metrics may be displayed along with host vehicle fuel usage information (e.g., the host vehicle's fuel consumption rate) on a suitable display associated with, for example, ICP 114, a driver control interface, or a navigational system that is integrated with the host vehicle's radio. The exemplary fuel usage comparison process is then repeated to continually update the displayed fuel usage information as indicated in FIG. 3 at 156.

As mentioned previously, the comparison vehicle's fuel rate may be determined by the performance of a suitable comparison vehicle fuel usage process (see step 150 in FIG. 3). This process may estimate the comparison vehicle's fuel consumption rate by determining the torque and speed/RPM at which the comparison vehicle's engine must operate to generate the torque and rotational speed at its wheels matching that generated at the host vehicle's wheels. An exemplary embodiment of such a process (i.e., process 150) is illustrated in FIGS. 4 and 5.

Figure 4:
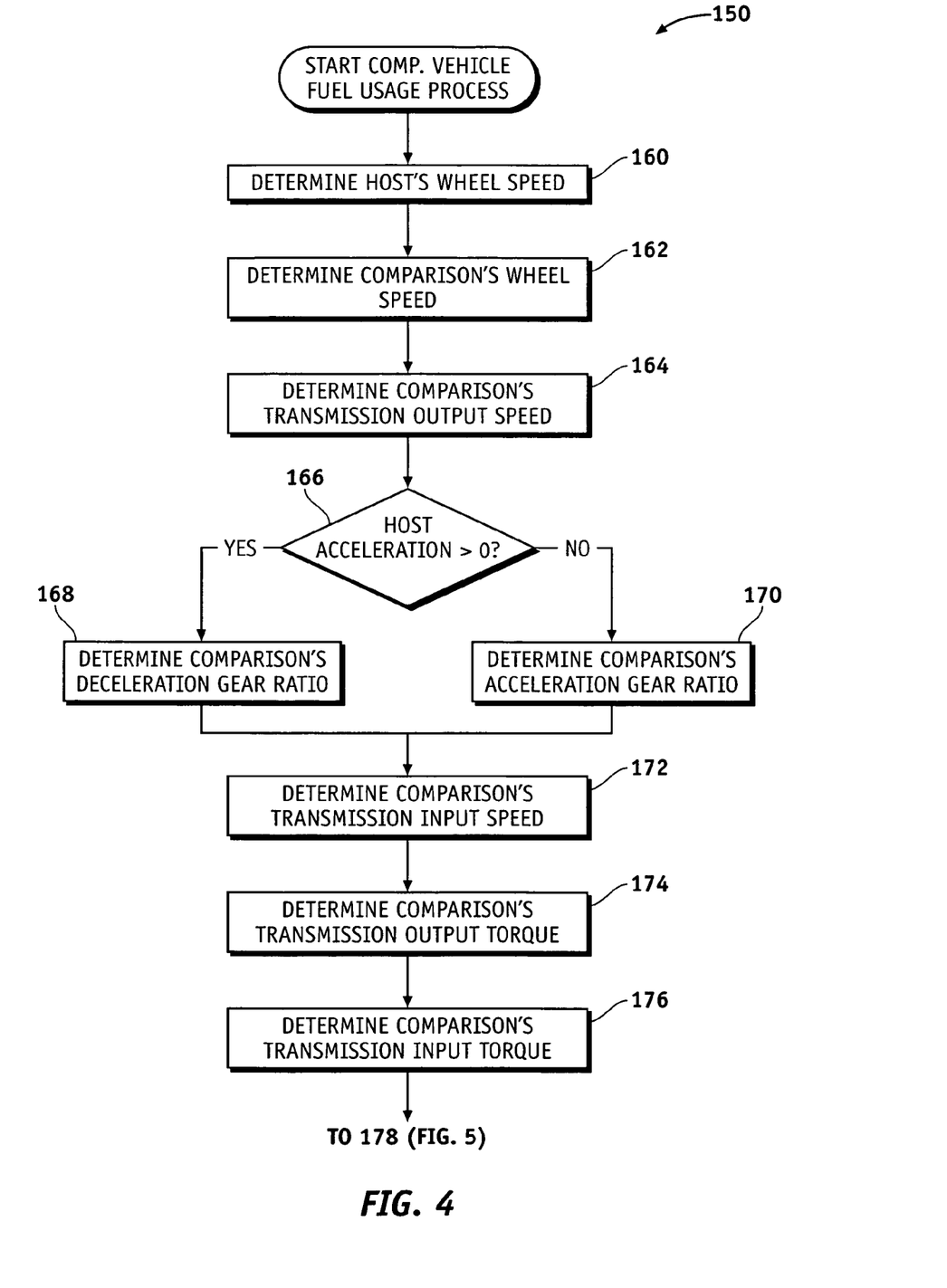
FIGS. 4 and 5 are flowcharts illustrating an exemplary method for comparing vehicle fuel usage suitable for use in conjunction with the process illustrated in FIG. 3.
Figure 5:
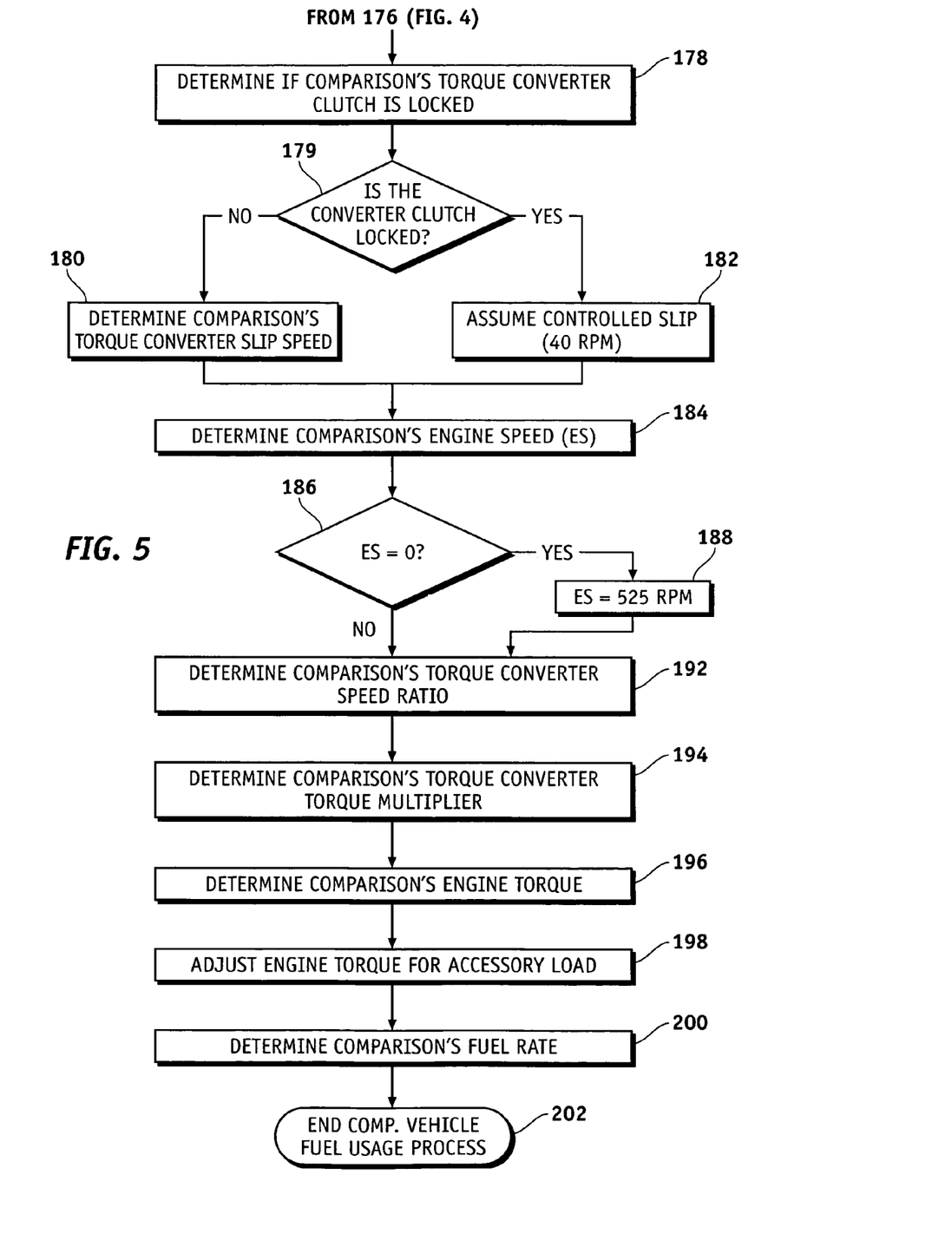

As indicated at 160 in FIG. 4, process 150 begins by determining the wheel speed of the host vehicle by way of the following equation:

$$WS_{host} = K\left(\frac{VS_{host}}{2\pi \times TRR_{host}}\right) \quad (4)$$

where WS is wheel speed, VS is vehicular speed, TRR is tire rolling radius (multiplied by $2\pi$ in EQ. 4 to convert to the tire rolling circumference), and K is a constant representing distance and time conversions (for English units in miles and feet K may be approximately 5280/60, and for metric units in kilometers and meters K may be approximately 1000/60). In EQ. (4) and hereafter, it should be noted that the subscripts "host" and "comp." indicate that the metric to which the subscript is attached describes the host vehicle and the comparison vehicle, respectively.

After determining the host vehicle's wheel speed, the comparison vehicle's wheel speed may be determined as indicated at step 162 in accordance with the following equation:

$$WS_{comp.} = WS_{host}\left(\frac{TRR_{comp.}}{TRR_{host}}\right) \quad (5)$$

However, it should be noted that, although wheel speed is calculated in the exemplary embodiment, in other embodiments of the invention wheel speed may instead be monitored by a suitable sensor and simply reported to a processor, such as processor 150. Next, the process determines the comparison vehicle's transmission output speed (TOS) in the following manner (164 in FIG. 4):

$$TOS_{comp.} = WS_{comp.} \times AR_{comp.} \quad (6)$$

where AR is axle ratio.

The comparison vehicle's transmission output speed may be utilized to help determine the comparison vehicle's transmission input speed; however, first the appropriate gear ratio must be determined. Thus, as indicated in FIG. 4 at 166, if the host vehicle is accelerating, the corresponding acceleration gear ratio is established via a three dimensional look-up table associating gear ratio with the host vehicle's pedal position and speed in the well-known manner (170). Conversely, if the host vehicle is not accelerating (i.e., if the host vehicle is coasting or decelerating), the comparison vehicle's deceleration gear ratio is established with a similar three dimensional look-up table (168). After being established, the comparison vehicle's gear ratio may be multiplied by the transmission output speed to determine the transmission input speed (TIS) of the comparison vehicle (172 in FIG. 4) as indicated by EQ. 7 below:

$$TIS_{comp.} = TOS_{comp.} \times GR_{comp.} \quad (7)$$

where GR is the gear ratio.

Next, as indicated in FIG. 4 at 174, the transmission output torque (TOT) may be determined in accordance with EQ. 8:

$$TOT_{comp.} = \frac{WT_{host}}{AR_{comp.}} \quad (8)$$

where WT is wheel torque.

Although EQ. 8 will provide a fairly accurate estimate of the comparison vehicle's transmission output torque, it should be noted that, if the tire rolling radius for the host vehicle and for the virtual comparison vehicle differ, especially by a large amount, a more accurate estimate of the comparison vehicle's transmission output torque may be obtained using equations 8A–8D:

$$F_{host} = \frac{WT_{host}}{TRR_{host}} \quad (8A)$$

$$F_{comp.} = F_{host}\left(\frac{M_{comp.}}{M_{host}}\right) \quad (8B)$$

$$WT_{comp.} = F_{comp.} \times TRR_{comp.} \quad (8C)$$

$$TOT_{comp.} = \frac{WT_{comp.}}{AR_{comp.}} \quad (8D)$$

where $F_{host}$ is the drive force exhibited on the host vehicle, $F_{comp.}$ is the drive force exhibited on the comparison vehicle, $M_{comp.}$ is the comparison vehicle's mass, and $M_{host}$ is the host vehicle's mass.

After the comparison vehicle's transmission output torque is known, the transmission input torque (TIT) may subsequently be determined in accordance with EQ. 9 (shown at 176 in FIG. 4):

$$TIT_{comp.} = \frac{TOT_{comp.}}{GR_{comp.}} \quad (9)$$

After establishing the comparison vehicle's transmission input torque, the process may move to step 178 illustrated in FIG. 5 to determine if the comparison vehicle's torque converter clutch is locked by way of a known four dimensional look-up table that compares torque converter clutch to the host vehicle's pedal position, the host vehicle's vehicular speed, and the comparison vehicle's gear ratio. If it is determined that the torque converter clutch is not locked (determined at 179 in FIG. 5), then the torque converter slip speed (SS) may be determined via the following empirical equation (180 in FIG. 5):

$$SS_{comp.} = (-0.76) \times (TIT_{comp.})^2 + 14.3 \times TIT_{comp.} + 500 \qquad (10)$$

where transmission input torque is in Newton-meters and slip speed is in revolutions per minute.

If, instead, the torque converter clutch is determined to be locked at 180, the process assumes torque converter slip speed to be a controlled slip of 40 RPM as indicated in FIG. 5 at 182. After determining the slip speed, the comparison vehicle's engine speed (ES) may be determined as follows (184 in FIG. 5):

$$ES_{comp.} = TIS_{comp.} + SS_{comp.} \qquad (11)$$

After determining the comparison vehicle's engine speed, the process next determines the comparison vehicle's engine torque to ultimately establish the comparison vehicle's fuel consumption rate. If the host vehicle is a hybrid vehicle, the process preferably accounts for the rotational frequency of the comparison vehicle's engine at idle when the hybrid host is stopped and its engine is shut off. If the host vehicle is at a standstill (determined in FIG. 5 at 186), this may be done by assuming the comparison vehicle's engine speed to be 525 RPM as indicated in FIG. 5 at 188. If, however, the host vehicle is moving (again, determined in FIG. 5 at 186), the process determines the comparison vehicle's transmission torque converter speed ratio (SR) in the following manner (indicated in FIG. 5 at 192):

$$SR_{comp.} = \frac{TIS_{comp.}}{ES_{comp.}} \qquad (12)$$

Next, the torque converter torque multiplier (TM) is established via a conventional two dimensional look-up table that associates the torque multiplier with the torque converter speed ratio (indicated in FIG. 5 at 194). After the torque multiplier is known, the process determines the comparison vehicle's engine torque (ET) in accordance with EQ. 13 below (196 in FIG. 5):

$$ET_{comp.} = \frac{TIT_{comp.}}{TM_{comp.}} \qquad (13)$$

It may be desirable to adjust the engine torque determined from EQ. 13 to account for the load placed on the host vehicle's engine by the accessories (e.g., the vehicle's air conditioning) currently operating in the host vehicle as reported on Power-Train Expansion LAN 108 by ACM 122. As indicated at 198 in FIG. 5, this may be done by simply adding the accessory load to the comparison vehicle's engine torque determined in EQ. 13.

Now that the comparison engine's speed and torque based on the host vehicle's operating conditions are known, the comparison vehicle's fuel consumption rate may be determined as indicated in FIG. 5 at 200. This may be done by reference to a three dimensional look-up table wherein fuel rate is associated with engine speed and engine torque in the well-known manner. After the comparison vehicle's fuel rate has been determined, process 150 is complete. It should thus be appreciated that the process has now utilized fixed parameters describing physical aspects of the host vehicle and the comparison vehicle and variable parameters relating to the operational conditions of the host vehicle to determine comparison vehicle fuel usage data (e.g., the comparison vehicle's fuel consumption rate), which may then be compared to host vehicle fuel usage data in the manner described above in conjunction with EQs. 1–3 and steps 152 and 154 of FIG. 3.

On a closing note, it may be desirable to further improve accuracy in determining the comparison vehicle's fuel consumption rate by considering component efficiencies, including, but not limited to, axle efficiencies, transmission efficiencies, and torque converter efficiencies. Axle efficiency, for example, may be accounted for by multiplying the comparison's vehicle axle ratio ($AR_{comp.}$) by a value representing the comparison vehicle's axle efficiency (e.g., approximately 0.97 for a rear drive differential) in EQ. 8 above, providing that the host vehicle is moving. In a similar fashion, transmission efficiency, which may include transmission gear losses and hydraulic losses, may be accounted for by multiplying the comparison's gear ratio ($GR_{comp.}$) by a value representing the comparison vehicle's transmission efficiency (e.g., a number between 0 and 1 determined by, for example, a conventional look-up table) in EQ. 9 above. Lastly, torque converter efficiency may be accounted for by multiplying the comparison vehicle's torque converter multiplier ($TM_{comp.}$) by a value representing torque converter efficiency in EQ. 13 above. However, it may be desirable to only compensate for torque converter efficiencies when the torque converter is unlocked; when locked, the torque converter is very efficient and thus torque converter efficiencies have little effect on the comparison vehicle's fuel consumption rate.

It should thus be appreciated that there has been provided a fuel usage and savings informational system for use on an alternative fuel vehicle that determines the vehicle's fuel consumption and compares it to the estimated fuel usages of an analogous, exclusively gasoline-powered vehicle operating under similar driving conditions. It should further be appreciated that there has been provided a system that indicates the host vehicle's instantaneous fuel usage, which a driver may utilize to learn how to operate the vehicle in a fuel efficient manner.

While a limited number of exemplary embodiments have been presented in the foregoing detailed description, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing the exemplary embodiments. Various changes can be made in the function and arrangement of elements without departing from the scope of the invention as set forth in the appended claims and the legal equivalents thereof.

What is claimed is:

1. A fuel savings informational system for implementation on an alternative fuel vehicle the operation of which may be characterized by a first plurality of fixed parameters and a second plurality of variable parameters, the informational system for comparing the fuel consumption of the alternative fuel vehicle to that of a virtual comparison vehicle characterized by a third plurality of fixed parameters, the system comprising:

a plurality of sensors for monitoring the second plurality of variable parameters; and a processor coupled to said plurality of sensors, said processor configured to (i) recall the first and third pluralities of fixed parameters; (ii) capture data corresponding to the second plurality of variable parameters; (iii) determine the fuel consumption of the alternative fuel vehicle from the second plurality of variable parameters; (iv) estimate the fuel consumption of the comparison vehicle from the second plurality of variable parameters and from the first and third pluralities of fixed parameters; and (v) compare the fuel consumption of the alternative fuel vehicle to the estimated fuel consumption of the comparison vehicle.

2. A fuel savings informational system according to claim 1 further comprising a display coupled to said processor for displaying the results of the fuel consumption comparison.

3. A fuel savings informational system according to claim 2 wherein the alternative fuel vehicle and the comparison vehicle each have an axle and where the first plurality of fixed parameters includes a first axle ratio and the third plurality of fixed parameters includes a second axle ratio.

4. A fuel savings informational system according to claim 2 wherein the alternative fuel vehicle and the comparison vehicle have first and second wheels, respectively, and where the first plurality of fixed parameters includes the rolling radius of the first wheel and the third plurality of fixed parameters includes the rolling radius of the second wheel.

5. A fuel savings informational system according to claim 2 wherein the alternative fuel vehicle includes a wheel coupled to said plurality of sensors and wherein the second plurality of variable parameters comprises wheel speed and wheel torque.

6. A fuel savings informational system according to claim 5 wherein the alternative fuel vehicle further includes an accelerator pedal coupled to said plurality of sensors and wherein the second plurality of variable parameters further comprises vehicular speed, vehicular acceleration, and pedal position.

7. A fuel savings informational system according to claim 2 wherein said processor is further configured to display the instantaneous fuel consumption rate of the alternative fuel vehicle on said display.

8. A fuel savings informational system according to claim 2 wherein the alternative fuel vehicle has an engine coupled to said plurality of sensors, and wherein the second plurality of variable parameters includes engine speed and torque model output.

9. A fuel savings informational system according to claim 2 wherein the alternative fuel vehicle includes an engine having a predetermined number of cylinders, said engine coupled to said plurality of sensors, and wherein the second plurality of variable parameters comprises cylinder count, injector pulse width, and engine speed.

10. A fuel savings information system according to claim 2 wherein said processor is configured to estimate the fuel consumption of the comparison vehicle via a three dimensional look-up table associating fuel consumption with engine speed and engine torque of the alternative fuel vehicle.

11. A fuel savings informational system for implementation on a hybrid vehicle for comparing the fuel consumption of the hybrid vehicle to that of a virtual comparison vehicle, the operation of the hybrid vehicle being characterized by a plurality of variable operational parameters, the hybrid vehicle having a first predetermined axle ratio and a first predetermined tire rolling radii and the comparison vehicle having a second predetermined axle ratio and a second predetermined tire rolling radii, the system comprising:

a display deployed on the hybrid vehicle;

a plurality of sensors for monitoring the plurality of variable operational parameters; and a processor coupled to said display and to said plurality of sensors, said processor configured to (i) recall the first and second axle ratios and the first and second tire rolling radii; (ii) capture data corresponding to the plurality of variable operational parameters; (iii) determine the fuel consumption of the hybrid vehicle from a first subset of the plurality of variable operational parameters; (iv) estimate the fuel consumption of the comparison vehicle from a second subset of the plurality of variable operational parameters, from the first and second axle ratios, and from the first and second tire rolling radii; (v) compare the fuel consumption of the hybrid vehicle to the estimated fuel consumption of the comparison vehicle; and (vi) display the results of the comparison on said display.

12. A fuel savings informational system according to claim 11 wherein the alternative fuel vehicle includes a wheel and an accelerator pedal coupled to said plurality of sensors, and wherein the plurality of variable operational parameters comprises wheel speed, wheel torque, vehicular speed, vehicular acceleration, and pedal position.

13. A fuel savings informational system according to claim 11 wherein said processor is further configured to display the instantaneous fuel consumption rate of the alternative fuel vehicle on said display.

14. A method for informing a driver of a hybrid vehicle of the difference between the fuel consumption rate of a virtual comparison vehicle and the fuel consumption rate of a hybrid vehicle that includes a display, a plurality of sensors for measuring a plurality of variable operational parameters relating to the driving conditions experienced by the hybrid vehicle, and a processor for recalling a plurality of fixed parameters describing physical aspects of the hybrid vehicle and the comparison vehicle, the method comprising:

recalling the plurality of fixed parameters;

capturing data corresponding to the plurality of variable operational parameters;

determining hybrid vehicle fuel consumption rate from the plurality of variable operational parameters;

estimating comparison vehicle fuel consumption rate from the plurality of variable operational parameters and the plurality of fixed parameters;

comparing hybrid vehicle fuel consumption rate to comparison vehicle fuel consumption rate; and displaying the results of the comparison on the display.

15. The method according to claim 14 wherein the step of recalling comprises recalling tire rolling radii and axle ratios for the hybrid vehicle and for the comparison vehicle.

16. The method according to claim 14 wherein the hybrid vehicle includes a wheel and an accelerator pedal and the step of estimating comprises determining the comparison vehicle fuel consumption rate from pedal position, vehicular acceleration, vehicular speed, wheel torque, wheel speed, tire rolling radii, and axle ratios.

17. The method according to claim 14 wherein the step of displaying further comprises displaying the instantaneous fuel consumption rate of the hybrid vehicle on the display.

18. The method according to claim 16 wherein the step of estimating comprises determining (i) the comparison vehicle deceleration gear ratio from the pedal position and from the vehicular speed when the acceleration of the hybrid vehicle is less than zero, and (ii) the comparison vehicle acceleration gear ratio from the pedal position and the vehicular speed when the acceleration of the hybrid vehicle is greater than zero.

19. The method according to claim 16 wherein the step of estimating comprises (i) calculating the torque converter slip speed when the torque converter clutch of the virtual comparison vehicle is unlocked, and (ii) assuming a predetermined torque converter slip speed when the torque converter clutch of the virtual comparison vehicle is locked.

20. The method according to claim 16 wherein the step of estimating comprises assigning a predetermined engine speed to the engine of the comparison vehicle when the speed of the hybrid vehicle is substantially zero.

* * * * *